US005721589A

United States Patent [19]
Murata

[11] Patent Number: 5,721,589
[45] Date of Patent: Feb. 24, 1998

[54] MOVING PICTURE CODING APPARATUS WHICH CALCULATES AN OPTIMUM QUANTIZATION STEP SIZE USING THE RELATIONSHIP BETWEEN THE QUANTIZATION STEP SIZE AND A GENERATED BIT AMOUNT

[75] Inventor: Eri Murata, Tokyo, Japan

[73] Assignee: NEC Corporation, Tokyo, Japan

[21] Appl. No.: 517,769

[22] Filed: Aug. 22, 1995

[30] Foreign Application Priority Data

Aug. 22, 1994 [JP] Japan .................................. 6-196567

[51] Int. Cl.$^6$ .................................................. H04N 7/18
[52] U.S. Cl. ..................... 348/405; 348/406; 348/404; 348/419
[58] Field of Search ........................... 348/405, 407, 348/415, 419, 406, 402, 409

[56] References Cited

U.S. PATENT DOCUMENTS

| | | | |
|---|---|---|---|
| 5,038,209 | 8/1991 | Hang | 348/405 |
| 5,089,888 | 2/1992 | Zdepski et al. | 348/405 |
| 5,136,377 | 8/1992 | Johnston et al. | 348/405 |
| 5,231,484 | 7/1993 | Gonzales et al. | 348/405 |
| 5,333,012 | 7/1994 | Singhal et al. | 348/419 |
| 5,335,016 | 8/1994 | Nakagawa | 348/405 |
| 5,396,567 | 3/1995 | Jass | 348/405 |
| 5,410,351 | 4/1995 | Kojima | 348/405 |
| 5,426,463 | 6/1995 | Reininger et al. | 348/405 |
| 5,442,401 | 8/1995 | Murakami et al. | 348/405 |
| 5,489,943 | 2/1996 | Kutner | 348/405 |

FOREIGN PATENT DOCUMENTS

| | | |
|---|---|---|
| 4-114585 | 4/1992 | Japan . |
| 4-178089 | 6/1992 | Japan . |
| 4-315369 | 11/1992 | Japan . |
| 4-315370 | 11/1992 | Japan . |
| 7-59081 | 3/1995 | Japan . |

OTHER PUBLICATIONS

Yasuhiro Takishima et al., "A Study of On Control Method for Low Bit Rate Video Coding" (1990), pp. 7–63.
ISO–IEC/JTC1/SC29/WG11, International Organisation for Standardisation, Apr., 1993, pp. 53–72.

*Primary Examiner*—Tommy P. Chin
*Assistant Examiner*—Anand S. Rao
*Attorney, Agent, or Firm*—Sughrue, Mion, Zinn, Macpeak & Seas, PLLC

[57] ABSTRACT

A moving picture coding apparatus wherein the amount of operation for calculation of an quantization step size to be used for coding of a picture signal by a coding section is reduced includes a bit amount estimation section estimates an amount of bits to be generated for a currently inputted frame using a predetermined estimated quantization step size. A coding section encodes the currently inputted frame using a quantization step size. A calculation section derives, from the estimated quantization step size used and the estimated bit amount estimated by the bit amount estimation section for the currently inputted frame, an estimated quantization step size used and an estimated bit amount estimated by the bit amount estimation section for the last frame, and a quantization frame used and an amount of bits generated by the coding section for the last frame, a relational expression between the quantization step size and the bit amount, and calculates, based on the thus derived relational expression, the quantization step size with which a bit amount equal to a predetermined target bit amount is obtained.

11 Claims, 15 Drawing Sheets

5,721,589

1

MOVING PICTURE CODING APPARATUS WHICH CALCULATES AN OPTIMUM QUANTIZATION STEP SIZE USING THE RELATIONSHIP BETWEEN THE QUANTIZATION STEP SIZE AND A GENERATED BIT AMOUNT

BACKGROUND OF THE INVENTION

1. Field of the Invention

This invention relates to a moving picture coding apparatus wherein the amount of bits to be generated by quantization is controlled, and more particularly to a moving picture coding apparatus wherein an optimum quantization step size to be used for coding is calculated using a relational expression between a quantization step size and a generated bit amount.

2. Description of the Related Art

Various moving picture coding apparatuses which make use of a relational expression between a quantization step size and a generated bit amount have conventionally been proposed. One of the conventional moving picture coding apparatuses is, for example, an "image processing apparatus" disclosed in Japanese Patent Laid-Open Application No. Heisei 4-315370. The image processing apparatus will be described with reference to FIG. 16. A bit amount estimation section 10 and another bit amount estimation section 11 calculate bit amounts $I_1$ and $I_2$ to be obtained when moving picture data are coded using preset quantization step sizes $Q_1$ and $Q_2$, respectively. A quantization step size Q and a bit amount I have such a relationship as seen in FIG. 17. This relationship can be represented, using coefficients a and b, as given by the following linear expression:

$$\log I = a \times \log Q + b \quad (1)$$

A calculation section 12 calculates the coefficients a and b from $(Q_1, I_1)$ and $(Q_2, I_2)$ and calculates, in accordance with the expression (1) above, a quantization step size $Q_0$ with which a target bit amount $I_n$ is to be obtained. A coding section 13 performs coding of picture data using the quantization step size $Q_0$.

In the conventional image processing apparatus described above, in order to obtain a relational expression between a quantization step size and a bit amount for a current frame, estimation of a bit amount is performed twice using preset quantization step sizes before actual coding is performed. This makes the apparatus complicated and increases the amount of operation. Further, when a quantization step size to be used for actual coding is calculated using a relational expression, although a quantization step size with which an amount of bits nearest to a target bit amount is to be generated is selected, since a variation of the quantization step size between frames is not taken into consideration, the subjective picture quality is sometimes deteriorated by a variation of the quantization step size.

SUMMARY OF THE INVENTION

It is an object of the present invention to provide a moving picture coding apparatus wherein the number of operations for calculation of a relational expression is reduced and useless fluctuation of the quantization step size is suppressed to achieve stabilized quantization control.

In order to attain the object described above, according to the present invention, there is provided a moving picture coding apparatus wherein an amount of bits to be generated by quantization of a moving picture signal inputted in units of a frame is controlled, comprising bit amount estimation means for estimating an amount of bits to be generated for a currently inputted frame using a predetermined estimated quantization step size and outputting a result of the estimation as an estimated bit amount, coding means for quantizing the currently inputted frame using a given quantization step size, and calculation means for deriving, from the estimated quantization step size used by the bit amount estimation means and the estimated bit amount estimated by the bit amount estimation means for the currently inputted frame, an estimated quantization step size used by the bit amount estimation means and an estimated bit amount estimated by the bit amount estimation means for a previous frame to the currently inputted frame, and a quantization step size used by the coding means and an amount of bits generated by the coding means for the previous frame to the currently inputted frame, a relational expression between a quantization step size and the bit amount for the currently inputted frame, and calculating the quantization step size based on the thus derived relational expression so that the bit amount of the currently Inputted frame is equal to a predetermined target bit amount.

With the moving picture coding apparatus, when a relationship between the quantization step size and the bit amount is to be determined, a relational expression between the quantization step size and the bit amount can be derived by a single time operation of tentative coding for the current frame by making use of a result of the previous frame, and consequently, the amount of calculation can be reduced as much compared to that of the conventional moving picture coding apparatus described hereinabove. Since the values of the coefficients a and b in the expression (1) above usually vary between different pictures and between different frames, in order to calculate the two coefficients accurately, tentative coding must be performed using two different quantization step sizes for the same frame to estimate a bit amount. However, an investigation of variation of the values of the coefficients a and b proves that the coefficient b exhibits a comparatively great amount of variation between different frames, but the coefficient a exhibits a comparatively small amount of variation. Consequently, the value of the coefficient a in the current frame can almost be estimated from a result of processing for the previous frame or frames.

The moving picture coding apparatus may further comprise estimated quantization step size control means for controlling the estimated quantization step size for the currently inputted frame to be used by the bit amount estimation means in accordance with a predetermined algorithm from the amount of bits generated by the coding means for the previous frame to the currently inputted frame.

Where the estimated quantization step size control means is involved to control the quantization step size to be used for estimation of a bit amount, an error of the bit amount arising from an error of the value of the coefficient a described above can be suppressed. In particular, if it is assumed that the slope a(i) in the current frame is equal to the slope a(i−1) in the previous frame, then the relationship between the quantization step size and the bit amount for the current frame can be represented, as seen in FIG. 7, by a straight line which passes through a point $(\log Q_p(i), \log I_p(i))$ given by a result of estimation of a bit amount for the current frame and has the slope a(i−1). By using the straight line, a quantization step size with which the target bit amount $I_n$ is provided is discriminated to be Q(i). However, if the actual slope a(i) of the current frame is different from a(i−1), then the relationship between the quantization step size and the bit amount for the current frame is represented as given by a straight line indicated by a broken line in FIG. 7. Consequently, the actual bit amount when the quantization step size Q(i) is used is I(i) and gives rise to an error from the target bit amount $I_n$. If the quantization step size $Q_p(i)$ used for estimation of a bit amount is close to the quantization step size Q(i) to be used for actual coding, even if there is an error between the slope a(i−1) of the preceding frame and the slope a(i) of the current frame, the difference between the target bit amount $I_n$ and the actual bit amount I(i) is small. Therefore, by forecasting a quantization step size to be used actually for the current frame from a result of the previous frame and performing estimation of a bit amount using the thus forecast quantization step size as described above, the error of the bit amount arising from the error of the value of the coefficient a can be suppressed.

Or, the moving picture coding apparatus may further comprise motion amount discrimination means for discriminating an amount of motion of the input picture signal with reference to a predetermined reference, and target bit amount control means for setting the target bit amount in accordance with a result of discrimination of an amount of motion by the motion amount discrimination means.

Where the target bit amount to be used for calculation of a quantization step size is set in accordance with a character of a picture in this manner, the following advantage can be achieved. In particular, if control is performed otherwise with the target bit amount kept fixed, pictures which have a stable movement are surely obtained. Generally, however, motion smoothness is very important for an active scene which has a great amount of motion, and for a still scene which has a small amount of motion, and image clarity is also very important. If the target bit amount is set to a comparatively low value for frames which have a comparatively large amount of motion, the number of skipped frames is reduced and motion becomes smoother. If it is set to a comparatively high value for frames which have a comparatively small amount of motion, a comparatively small quantization step size is selected and image details become clearer.

Or else, the moving picture coding apparatus may further comprise a buffer for leveling coded data outputted from the coding means with respect to time, and target bit amount control means for setting the target bit amount to be used by the calculation means in accordance with a buffer occupancy of the buffer by the coded data.

Where the target bit amount to be used for calculation of a quantization step size is set in accordance with the buffer occupancy as described above, the following advantage can be achieved. In particular, if the buffer occupancy is compared with a reference value therefor and the target bit amount is set to a comparatively high value when the buffer has a sufficient margin whereas it is set to a comparatively low value when the buffer does not have a sufficient margin, when the buffer has a sufficient margin, since a comparatively small quantization step size is selected, the coded picture has a comparatively high definition. But when the buffer capacity is not sufficient, the bit amount is suppressed to prevent dropping of frames, and consequently, smoothness of motion can be maintained. By setting the target bit amount by taking both the amount of motion and the buffer occupancy into consideration, control which can achieve the two characteristics described above can be performed.

Otherwise, the moving picture coding apparatus may further comprise a buffer for leveling coded data outputted from the coding means with respect to time, and quantization step size correction means for correcting the quantization step size calculated by the calculation means in accordance with the quantization step size used by the coding means for the previous frame to the currently inputted frame and a buffer occupancy of the buffer by the coded data.

Where the quantization step size calculated once is corrected in accordance with the quantization step size used for the preceding frame and the buffer occupancy, the following advantage can be achieved. In particular, when the quantization step size Q(i) with which the target bit amount $I_n$ is provided is to be calculated in accordance with the relational expression between the quantization step size and the bit amount, the quantization step size Q(i) must be an integral number. When the quantization step size and the bit amount has such a relationship as seen in FIG. 9, the quantization step size with which the target bit amount $I_n$ is to be provided is q. However, since the quantization step size must be an integral number, one of integral values $Q_1$ and $Q_2$ close to q is selected. Where half-adjust (to count fractions of 0.5 and over as a unit and disregard the rest) is employed for conversion into an integral number, the integral value $Q_1$ in FIG. 9 will be selected. Since the half-adjust secures a bit amount comparatively close to a target value, the variation of the bit amount is stabilized. However, even a small difference in bit amount will vary the quantization step size. For example, when the quantization step size used in the preceding frame is $Q_2$, if a difference in bit amount is small, then production of information by variation of the quantization step size is suppressed and a comparatively stabilized picture is obtained when the value $Q_2$ is selected rather than when the value $Q_1$ is selected. Further, when the buffer occupancy is comparatively great and the buffer does not have a sufficient margin, the value $Q_2$ with which a comparatively small amount of bits is provided should be selected. By correcting the quantization step size taking the quantization step size of the previous frame and the buffer occupancy into consideration in this manner, further stabilized control can be performed.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
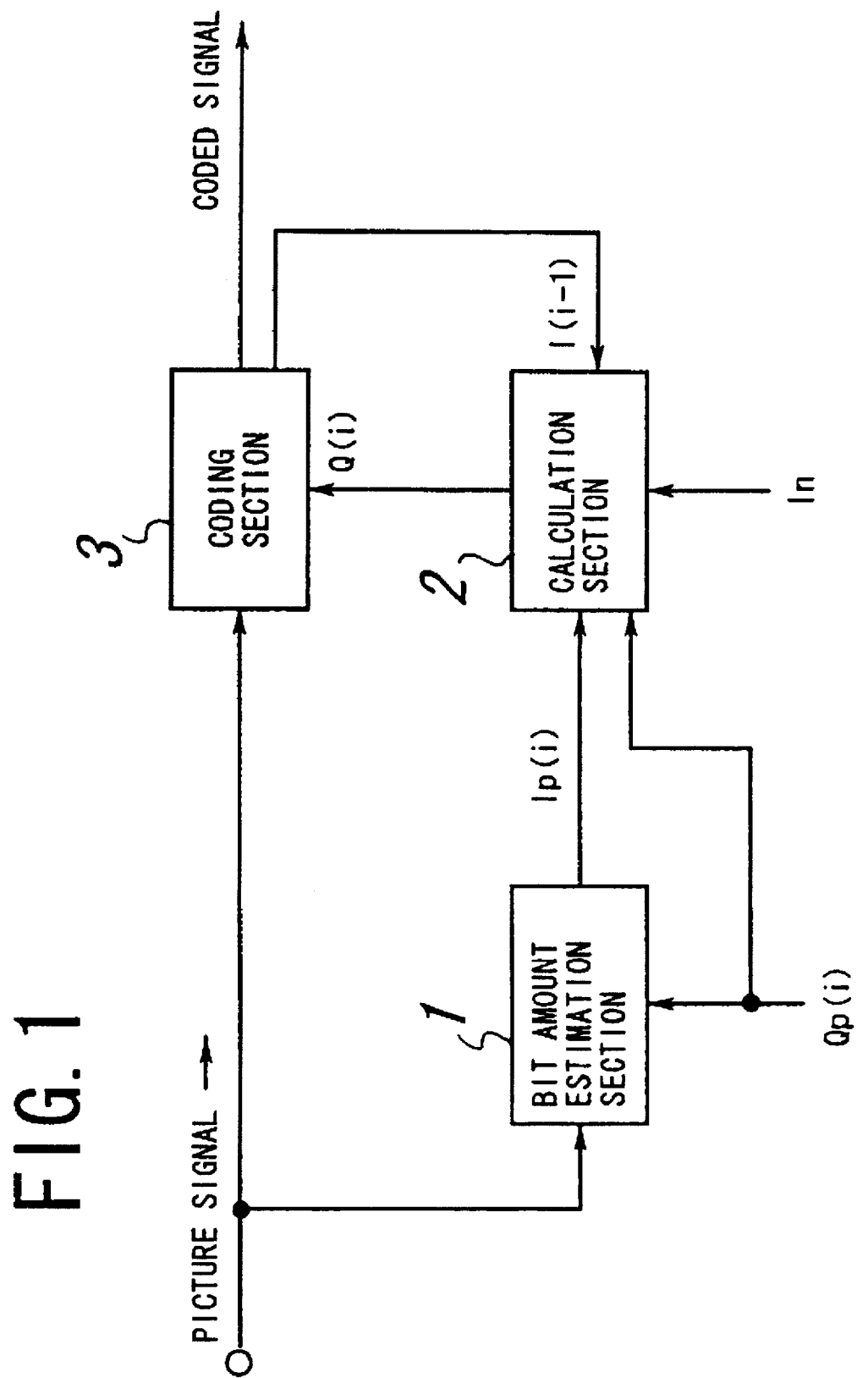
FIG. 1 is a block diagram of a moving picture coding apparatus showing a first preferred embodiment of the present invention.

Referring first to FIG. 1, there is shown in block diagram a moving picture coding apparatus according to a first preferred embodiment of the present invention. The moving picture coding apparatus shown includes a bit amount estimation section 1, a calculation section 2, and a coding section 3. The bit amount estimation section 1 performs tentative coding using an arbitrary quantization step size $Q_P(i)$ to calculate a bit amount $I_P(i)$. The calculation section 2 calculates a relationship between a quantization step size and a bit amount from a quantization step size $Q_P(i-1)$ used in estimation of a bit amount for the last frame and a resulted bit amount $I_P(i-1)$ then, a quantization step size $Q(i-1)$ actually used in coding for the last frame and a resulted bit amount $I(i-1)$ then, and a quantization step size $Q_P(i)$ used in estimation of a bit amount for the current frame and a resulted bit amount $I_P(i)$ then, and calculates, using the relationship thus calculated, a quantization step size $Q(i)$ with which a target bit amount $I_n$ is to be provided. The coding section 3 performs coding using the quantization step size $Q(i)$ calculated by the calculation section 2 using a result of calculation by the bit amount estimation section 1.

Figure 10:
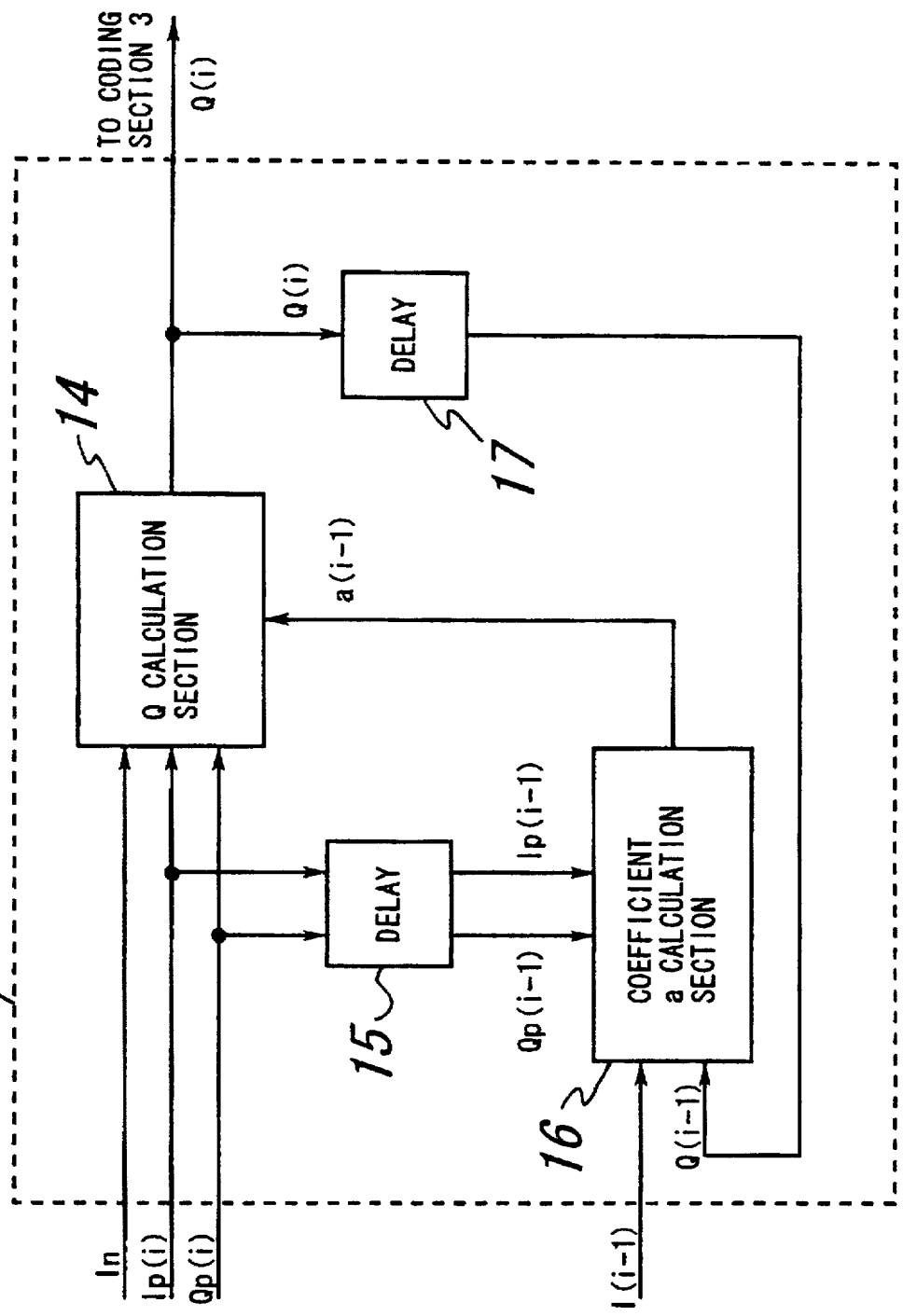
FIG. 10 is a block diagram showing a detailed construction of a calculation section of the moving picture coding apparatus shown in FIG. 1.

The processing of the calculation section 2 will be described in more detail with reference to FIG. 10. The calculation section 2 includes a Q calculation section 14, a first delay section 15, a coefficient a calculation section 16, and a second delay section The calculation section 2 receives, as inputs thereto, a target bit amount In, a bit amount $I_P(i)$ of the current frame, a quantization step size $Q_P(i)$ for the current frame and a bit amount $I(i-1)$ of the last frame. The bit amount $I_P(i)$ and the quantization step size $Q_P(i)$ are supplied to the Q calculation section 14 and also to the coefficient a calculation section 16 by way of the first delay section 15. The coefficient a calculation section 16 calculates a coefficient $a(i-1)$ of the last frame using the values $I_P(i-1)$, $Q_P(i-1)$, $I(i-1)$ and $Q(i-1)$ in accordance with the following expression:

$$a(i-1)=\log\{I_P(i-1)/I(i-1)\}/\log\{Q_P(i-1)/Q(i-1)\} \qquad (2)$$

The value of the coefficient $a(i-1)$ thus calculated is supplied to the Q calculation section 14. The Q calculation section 14 thus calculates the quantization step size $Q(i)$ for the current frame using the values $I_n$, $I_P(i)$, $Q_P(I)$ and $a(i-1)$ in accordance with the following equation:

$$Q(i)=Q_P(i)*\{I_n/I_P(i)\}^{1/a(i-1)} \qquad (3)$$

The value of the quantization step size $Q(i)$ thus calculated is outputted to the coding section 3 and also supplied to the coefficient a calculation section 16 by way of the second delay section 17 so that it may be used for calculation for the next frame. The processing of the calculation section 2 described above will be described in more detail below using mathematical expressions. By substituting a result of estimation of a bit amount for the last frame and a result of actual coding into the expression (1) above, the following two expressions are obtained:

$$\log I_P(i-1)=a(i-1)*\log Q_P(i-1)+b(i-1)$$

$$\log I(i-1)=a(i-1)*\log Q(i-1)+b(i-1)$$

From the two expressions, the coefficient $a(i-1)$ can be calculated in accordance with the expression (2) above. From the expression (1), the quantization step size $Q(i)$ with which the target bit amount $I_n$ is to be obtained is given by:

$$Q(i)=2^{(\log I_n - b(i))/a(i)}$$

and since the expression (1) also stands between the quantization step size $Q_P(i)$ and the bit amount $I_P(i)$, the quantization step size $Q(i)$ is given by:

$$Q(i)=Q_P(i)*\{I_n/I_P(i)\}^{1/a(i)}$$

Figure 6:
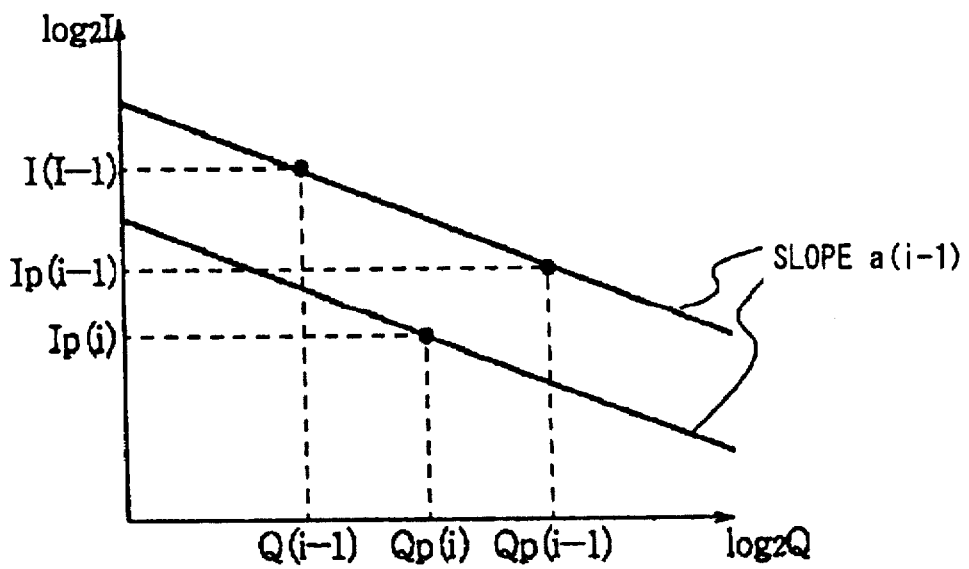
FIG. 6 is a graph illustrating a relationship between a quantization step size for a current frame and a bit amount calculated based on a result of a preceding frame and a result of estimation of a bit amount for the current frame.
Figure 7:
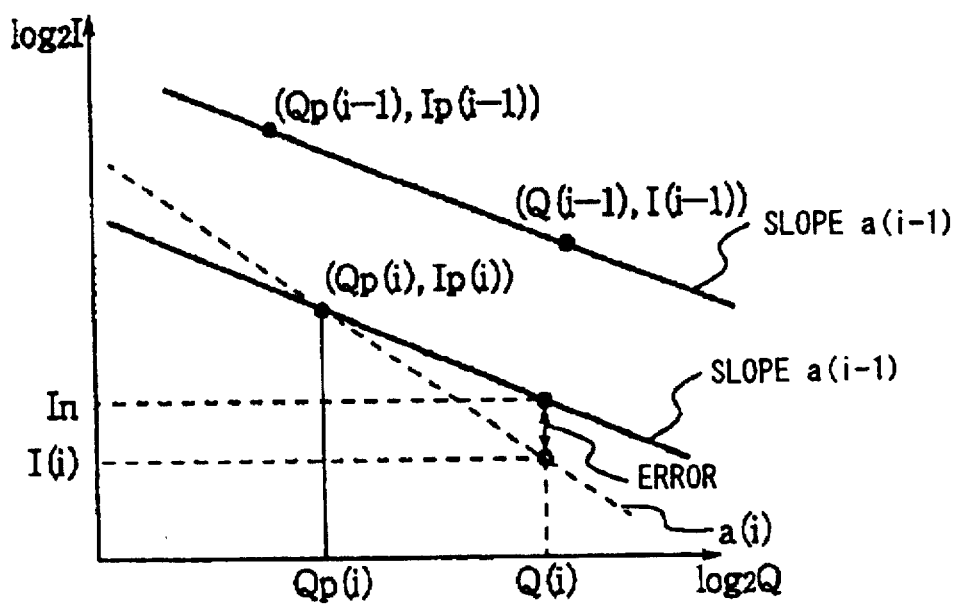
FIG. 7 is a graph illustrating an error of a generated bit amount produced when a coefficient a calculated from a result of a preceding frame is used.
Figure 8:
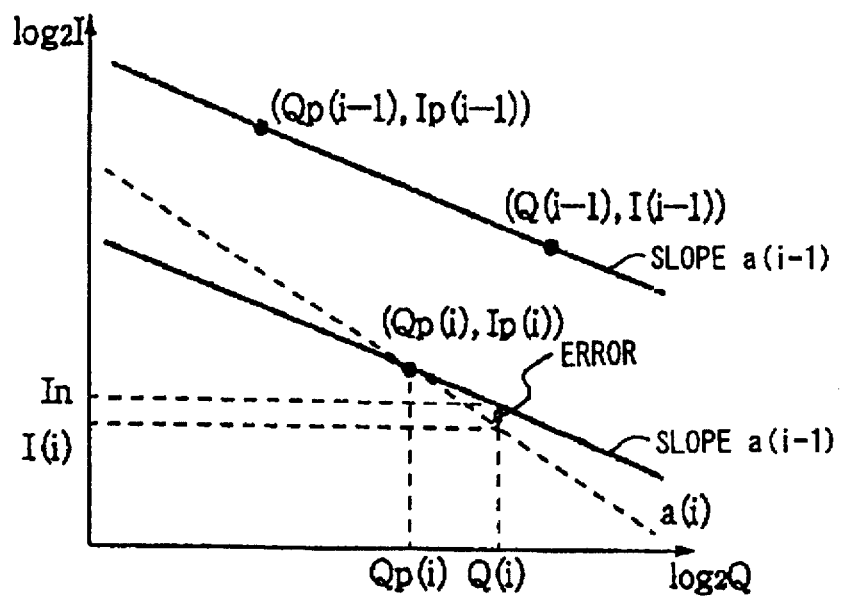
FIG. 8 is a graph illustrating a decrease of the error of a generated bit amount when a quantization step size to be used for estimation of a bit amount is controlled.
Figure 9:
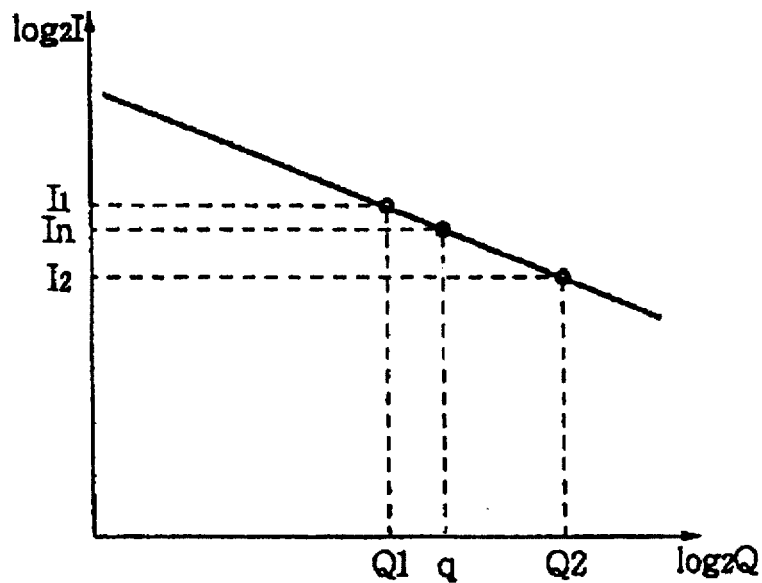
FIG. 9 is a graph illustrating an error of a generated bit amount produced by conversion into an integral number when a quantization step size to be used for a current frame is calculated from a relationship between a quantization step size and a bit amount.

By substituting $a(i)=a(i-1)$ into the expression above, the expression (3) is obtained. This will be described with reference to FIG. 6. In the processing described above, the relationship between the quantization step size and the bit amount for the current frame is approximated by a straight line having an equal slope to that of another straight line interconnecting a point $(\log Q_P(i-1), \log I_P(i-1))$ and another point $(\log Q(i-1), \log I(i-1))$ and passing a further point $(\log Q_P(i), \log I_P(i))$. By using a result of the last frame upon calculation of the relationship between a quantization step size and a bit amount by the calculation section 2 in this manner, estimation of a bit amount, which had to be performed twice by the conventional moving picture coding apparatus, must be performed only once, and consequently, the amount of calculation is reduced as much.

Figure 2:
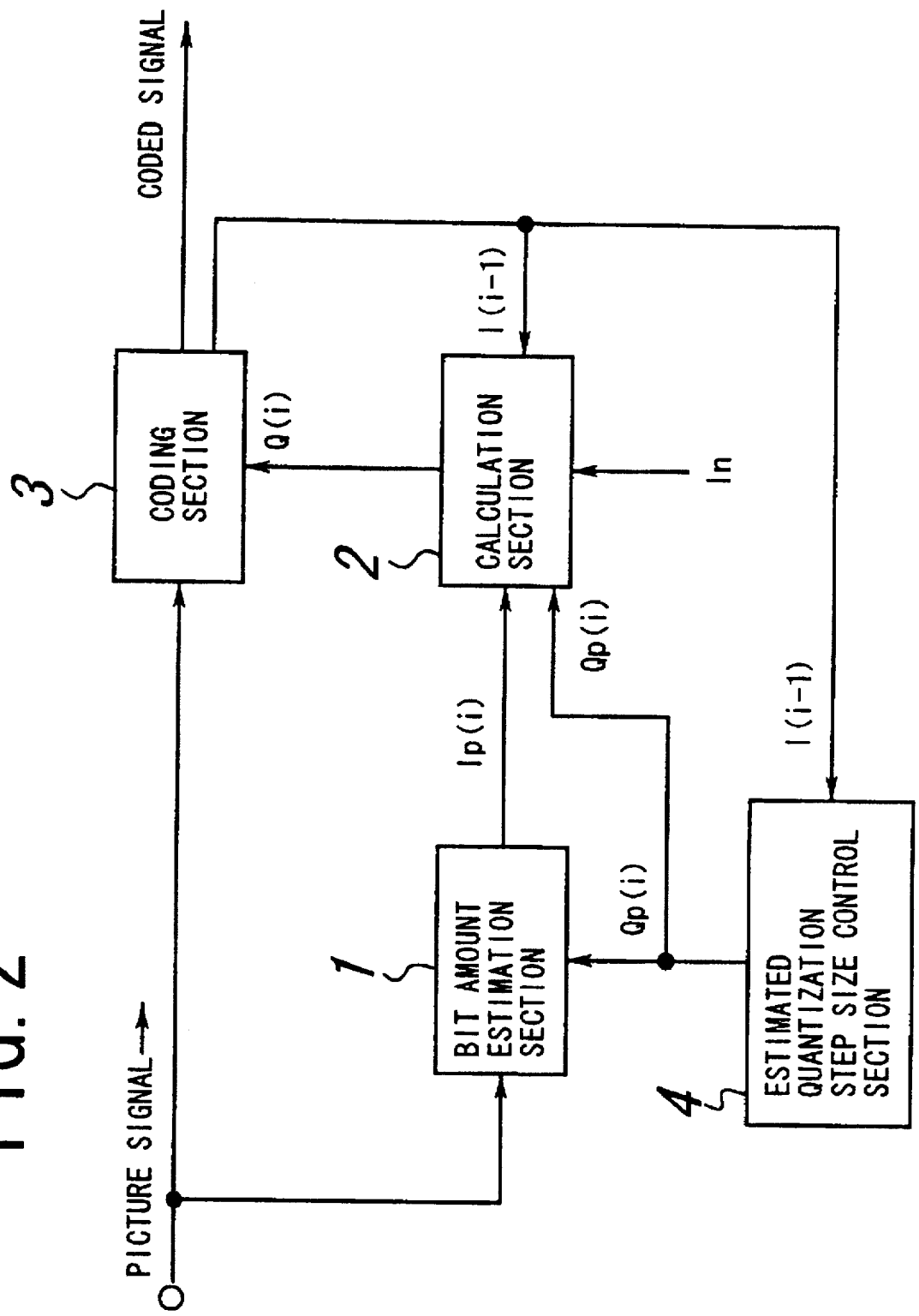
FIG. 2 is a block diagram of another moving picture coding apparatus showing a second preferred embodiment of the present invention.

FIG. 2 shows in block diagram a moving picture coding apparatus according to a second preferred embodiment of the present invention. The moving picture coding apparatus shown is a modification to and is different from the moving picture coding apparatus described above with reference to FIG. 1 in that it additionally includes an estimated quantization step size control section 4. The calculation section 2 and the coding section 3 operate similarly to the calculation section 2 and the coding section 3 of the moving picture coding apparatus of FIG. 1, respectively. The estimated quantization step size control section 4 forecasts a quantization step size to be used for coding for the current frame based on a bit amount of the last frame, and the bit amount estimation section 1 performs estimation of a bit amount using the thus forecast quantization step size. For the forecasting method of a quantization step size, a method disclosed, for example, in "A Study on Control Method for Low Bit Rate Video Coding", Collection of Drafts D-311 for the spring National Meeting of the Electronic Information Communications Society in 1990 may be used.

Figure 11:
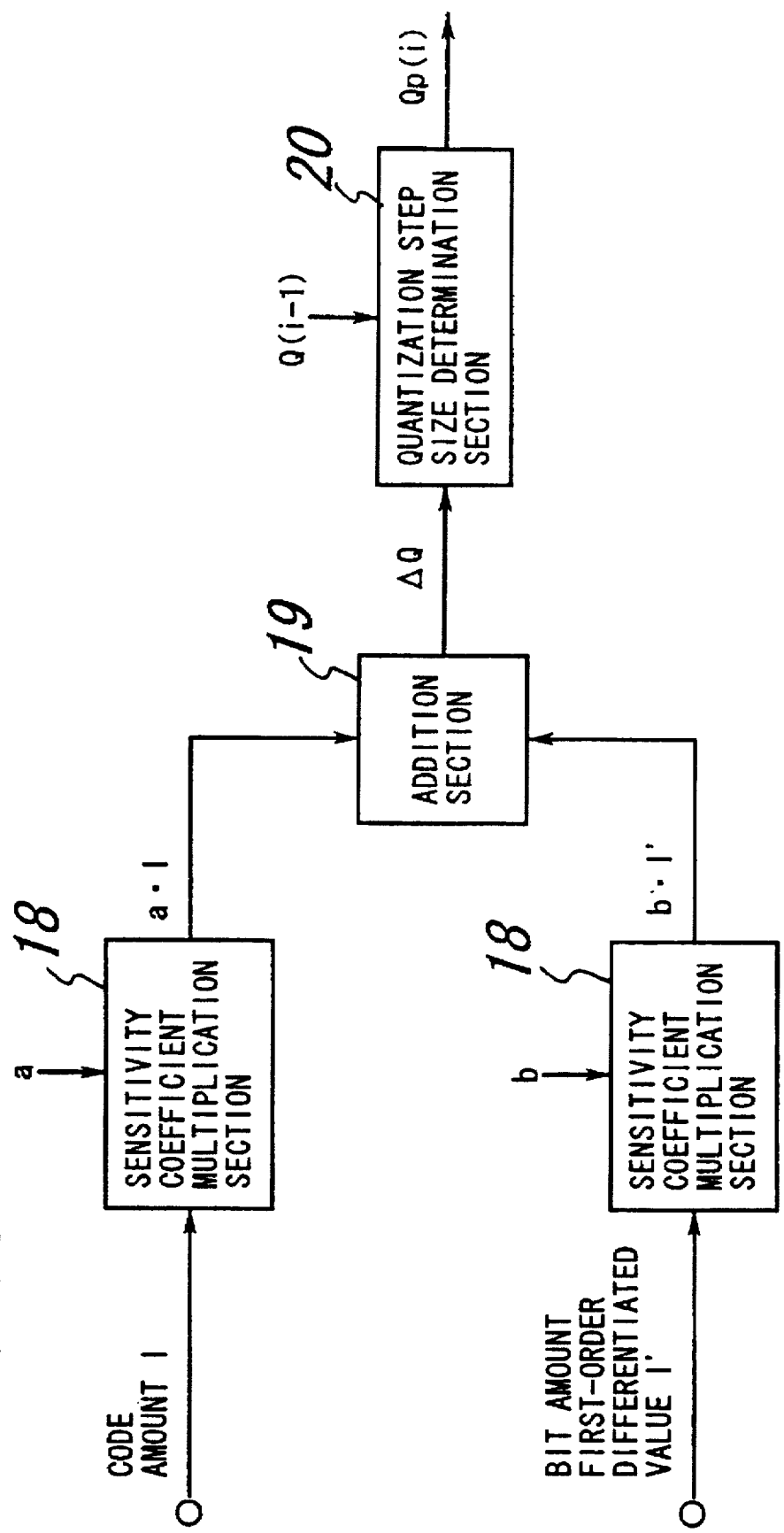
FIG. 11 is a block diagram showing an example of a quantization step size control section of the moving picture coding apparatus shown in FIG. 2.

FIG. 11 shows an example of a detailed construction of the estimated quantization step size control section 4. The estimated quantization step size control section 4 shown includes a pair of sensitivity coefficient multiplication sections 18, an addition section 19, and a quantization step size determination section 20. The sensitivity coefficient multiplication sections 18 multiply a generated bit amount I and a first-order differentiated value I' of the generated bit amount I by sensitivity coefficients a and b, respectively, and the addition section 19 adds the outputs of the sensitivity coefficient multiplication sections 18 to calculate a variation $\Delta Q$ of the quantization step size. The quantization step size determination section 20 adds the variation $\Delta Q$ of the quantization step size outputted from the addition section 19 to a quantization step size Q(i−1) of the last frame to forecast a quantization step size for the next frame. Alternatively, a variation of a quantization step size calculated from a generated bit amount may be corrected based on a magnitude of a movement of the screen as in a "Moving Picture Coding Controlling apparatus" disclosed in Japanese Patent Laid-Open Application No. Heisei 7-59081 (Japanese Patent Application No. Heisei 5-203119). For forecasting of a quantization step size, any other method than the methods described above may alternatively be employed only if a quantization step size is forecast from a result of coding of the last frame.

Where the quantization step size to be used by the bit amount estimation section 1 is controlled by the estimated quantization step size control section 4 in this manner, an error of a relational expression which arises from the fact that a result of coding of the last frame is used for calculation of a relational expression between a quantization step size and a bit amount can be suppressed.

Figure 3:
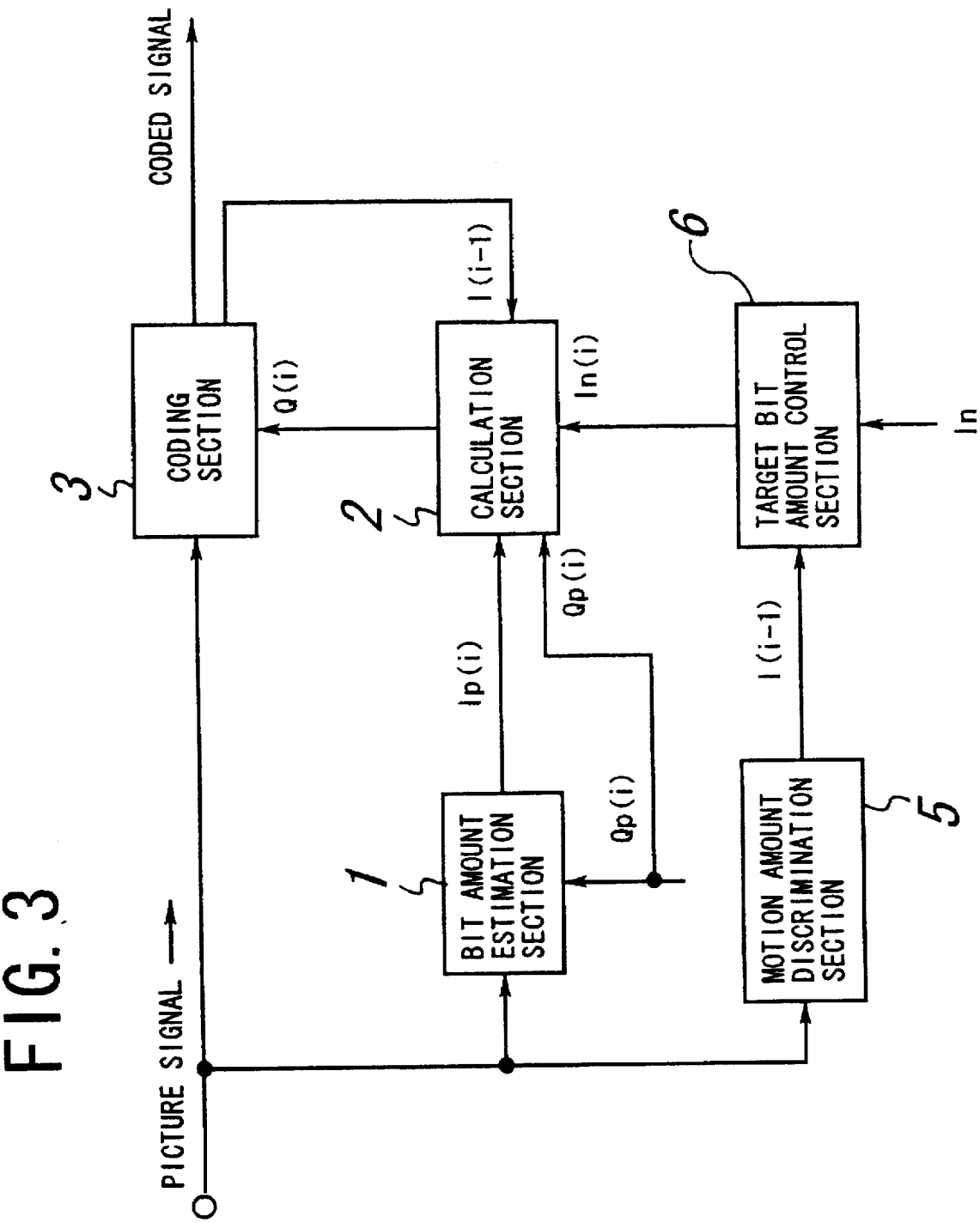
FIG. 3 is a block diagram of a further moving picture coding apparatus showing a third preferred embodiment of the present invention.

FIG. 3 shows in block diagram a moving picture coding apparatus according to a third preferred embodiment of the present invention. The moving picture coding apparatus shown is a modification to and is different from the moving picture coding apparatus described hereinabove with reference to FIG. 1 in that it additionally includes a motion amount discrimination section 5 and a target bit amount control section 6. The bit amount estimation section 1, the calculation section 2 and the coding section 3 operate similarly to the bit amount estimation section 1, the calculation section 2 and the coding section 3 of the moving picture coding apparatus of FIG. 1, respectively. The motion amount discrimination section 5 discriminates a characteristic of the current frame from an amount of inter-frame difference between the last frame and the current frame, a result of detection of motion amounts of individual blocks of the screen or the like. The target bit amount control section 6 controls a target bit amount $I_n(i)$ to be used by the calculation section 2 based on a result of discrimination by the motion amount discrimination section 5.

Figure 12:
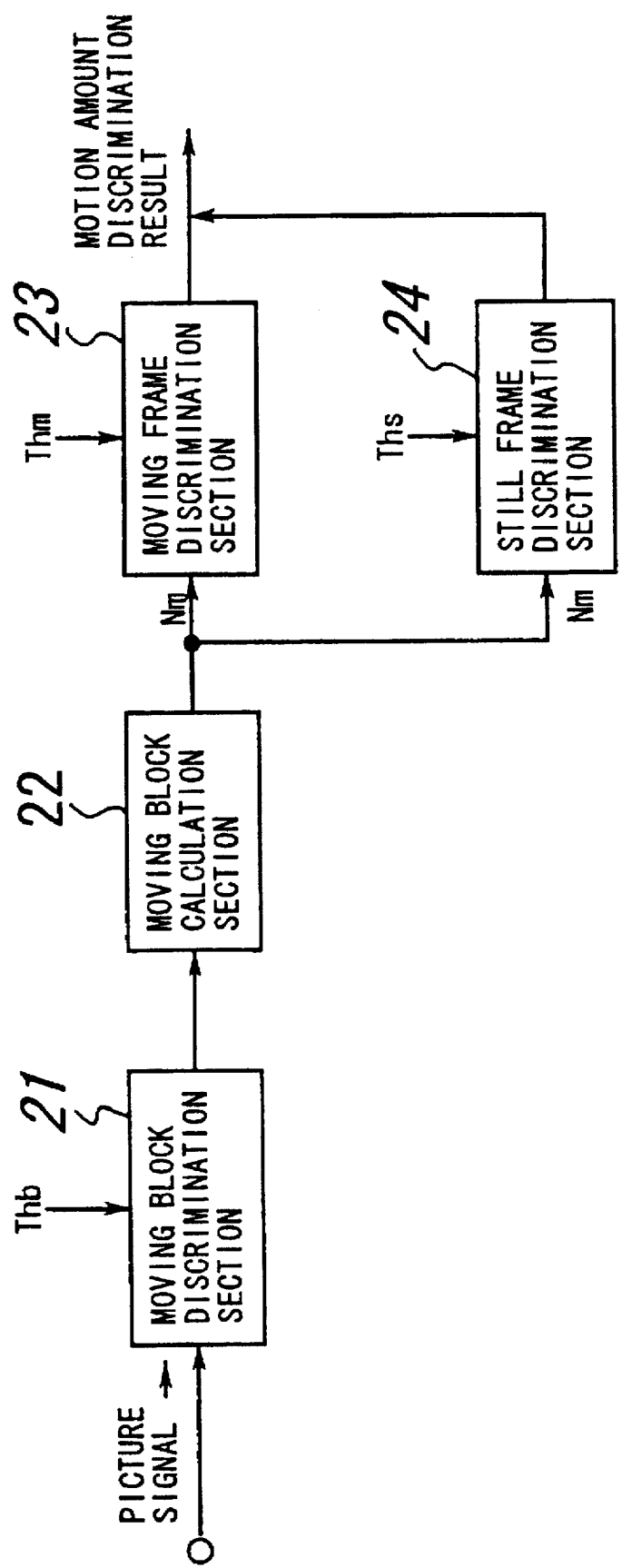
FIG. 12 is a block diagram showing a detailed construction of a motion amount discrimination section of the moving picture coding apparatus shown in FIG. 3.

An example of a detailed construction of the motion amount discrimination section 5 is shown in FIG. 12. Referring to FIG. 12, the motion amount discrimination section 5 shown includes a moving block discrimination section 21, a moving block calculation section 22, a moving frame discrimination section 23, and a still frame discrimination section 24. The moving block discrimination section 21 calculates a difference between the last frame and the current frame, adds an absolute value of the frame difference for each block and classifies each block into moving or still frame by thresholding the sum of absolute values using a preset threshold level Thb. The moving block calculation section 22 counts the number of those blocks discriminated as moving blocks by the moving block discrimination section 21 to obtain a moving block number Nm per frame. The moving frame discrimination section 23 compares a ratio Nm/N of the moving block number Nm obtained by the moving block calculation section 22 to a total block number N of the frame with a predetermined threshold level Thm, and if the ratio Nm/N is higher than the threshold level Thm, then the moving frame discrimination section 23 discriminates the current frame as a moving frame. Meanwhile, the still frame discrimination section 24 similarly compares the ratio Nm/N with a predetermined resting frame discrimination threshold level Ths, and if the ratio Nm/N is lower than the resting frame discrimination threshold level Ths, then the still frame discrimination section 24 discriminates the current frame as a still frame which exhibits no or a comparatively small amount of motion. For detection of a movement for each block, where motion compensation estimation is involved in tentative coding performed by the bit amount estimation section 1, a result of the motion compensation can be utilized.

Figure 13:
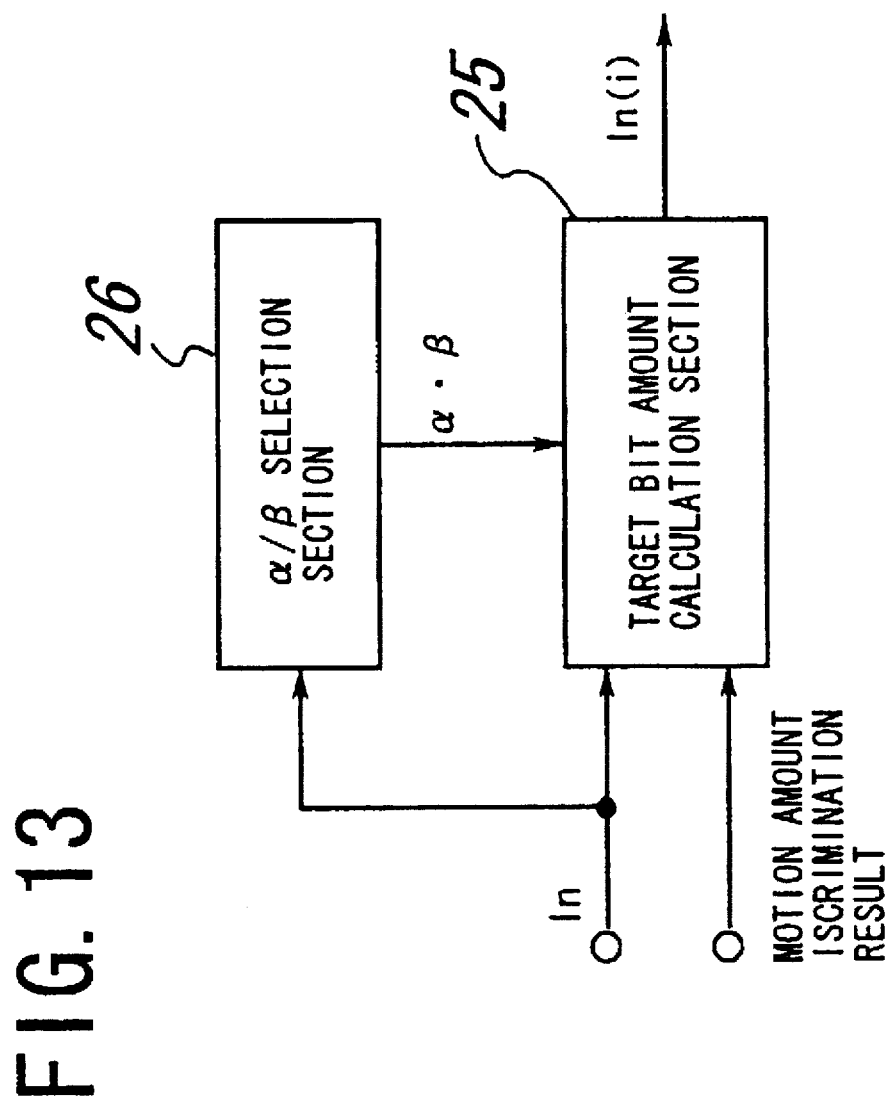
FIG. 13 is a block diagram showing a detailed construction of a target bit amount control section of the moving picture coding apparatus shown in FIG. 3.

FIG. 13 shows an example of a detailed construction of the target bit amount control section 6. Referring to FIG. 13, the target bit amount control section 6 shown includes a target bit amount calculation section 25, and an $\alpha/\beta$ selection section 26. The target bit amount calculation section 25 sets, based on a result of discrimination by the motion amount discrimination section 5 described above, the target bit amount to $I_n(i)=I_n-\alpha$ to make the target bit amount smaller than the reference value $I_n$ for the target bit amount when the current frame is a moving frame, but when the current frame is a still frame, the target bit amount calculation section 25 sets the target bit amount to $I_n(i)=I_n+\beta$ to make the target bit amount greater than the reference value $I_n$ for the target bit amount. The values of $\alpha$ and $\beta$ are in the positive and are individually selected in accordance with the target bit amount by the $\alpha/\beta$ selection section 26 from among optimum values determined statistically in advance.

Where a target bit amount to be used by the calculation section 2 is controlled in accordance with a result of discrimination by the motion amount discrimination section 5 by the target bit amount control section 6 in this manner, suitable control can be performed taking a character of a picture into consideration such that a picture which provides smooth motion is obtained with frames in which a great amount of motion is involved, but with frames in which a small amount of motion is involved, a high image clarity is achieved. Consequently, a suitable picture quality can be obtained.

Figure 4:
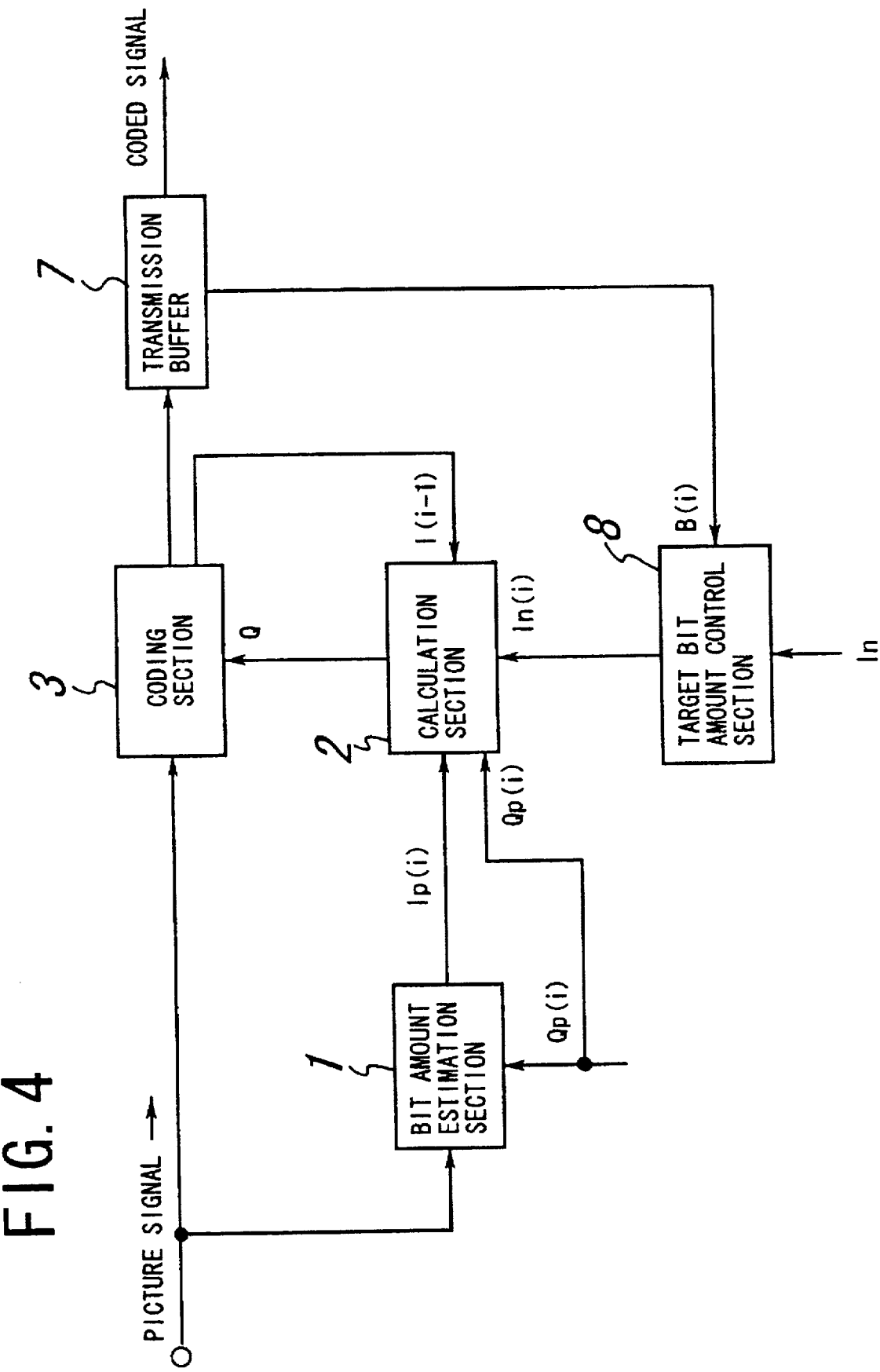
FIG. 4 is a block diagram of a still further moving picture coding apparatus showing a fourth preferred embodiment of the present invention.
Figure 14:
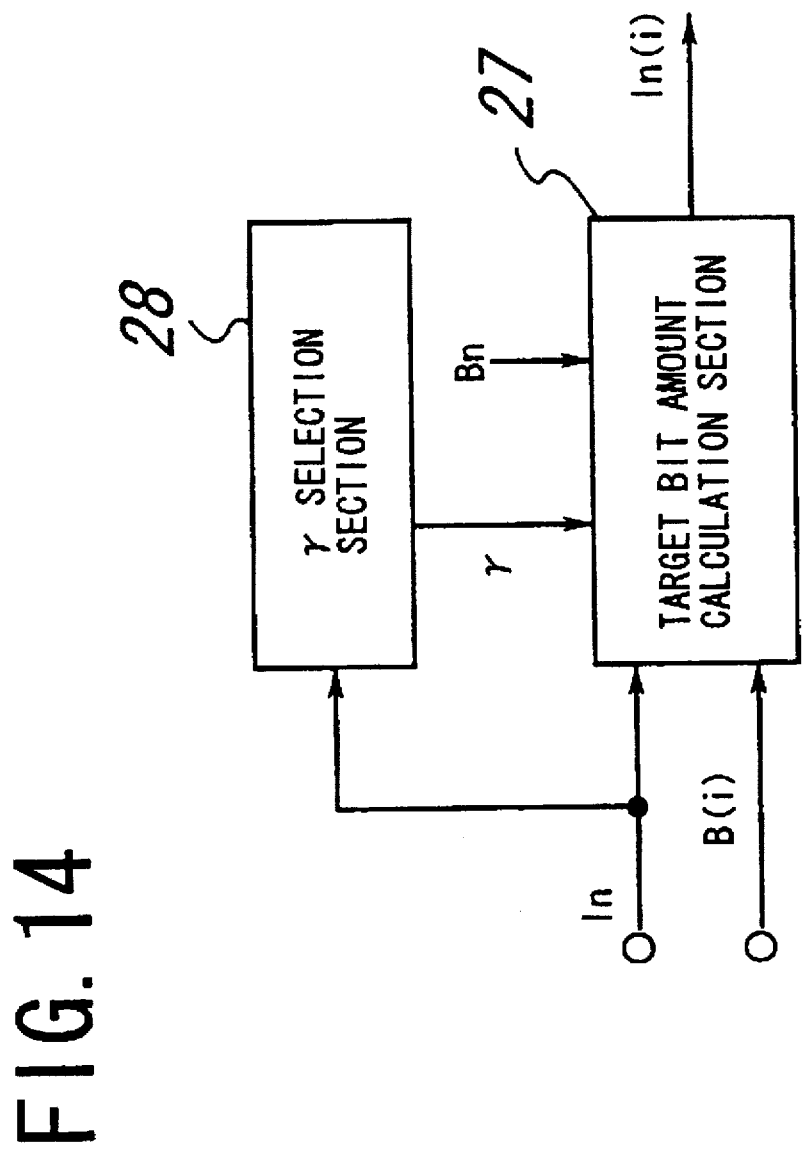
FIG. 14 is a block diagram showing a detailed construction of a target bit amount control section of the moving picture coding apparatus shown in FIG. 4.

FIG. 4 shows in block diagram a moving picture coding apparatus according to a fourth preferred embodiment of the present invention. The moving picture coding apparatus shown is a modification to and is different from the moving picture coding apparatus described hereinabove with reference to FIG. 1 in that it additionally includes a transmission buffer 7, and a target bit amount control section 8. The bit amount estimation section 1, the calculation section 2 and the coding section 3 operate similarly to the bit amount estimation section 1, the calculation section 2 and the coding section 3 of the moving picture coding apparatus of FIG. 1, respectively. The transmission buffer 7 accumulates and levels the output of the coding section 3 with respect to time and outputs a resultant signal. The target bit amount control section 8 controls the target bit amount $I_n$ to be used by the calculation section 2 in accordance with a buffer occupation amount B(i) of the transmission buffer 7. Upon control of the target bit amount, when the buffer occupation amount is smaller than a reference value, the target bit amount is increased, but when the buffer occupation amount is greater than the reference value, the target bit amount is decreased. The target bit amount control section 8 includes, as shown in FIG. 14, a target bit amount calculation section 27, and a $\gamma$ selection section 28. The target bit amount calculation section 27 calculates, using a reference value $I_n$ for the target bit amount, a reference value Bn for the buffer occupation amount and a current buffer occupation amount B(i), a target bit amount $I_n(i)$ of an object frame in accordance with the equation $I_n(i)=In+(Bn-B(i))\times\gamma(\gamma>0)$. The value of $\gamma$ is selected from among optimum values determined statistically in advance in accordance with the target bit amount by the $\gamma$ selection section 28. The target bit amount $I_n(i)$ may alternatively be set taking both of an amount of motion and a buffer occupation amount by constructing a moving picture coding apparatus so that it has a combination of the constructions of the moving picture coding apparatus shown in FIGS. 4 and 3.

Where the target bit amount to be used by the calculation section 2 is controlled in accordance with the buffer occupation amount of the transmission buffer 7 by the target bit amount control section 8 in this manner, stabilized control can be achieved such that, when the buffer has a sufficient margin (free area), a comparatively small (fine) quantization step size is used to assure a comparatively high definition, but when the buffer does not have a sufficient margin, a comparatively great (rough) quantization step size is used to minimize dropping of frames.

Figure 5:
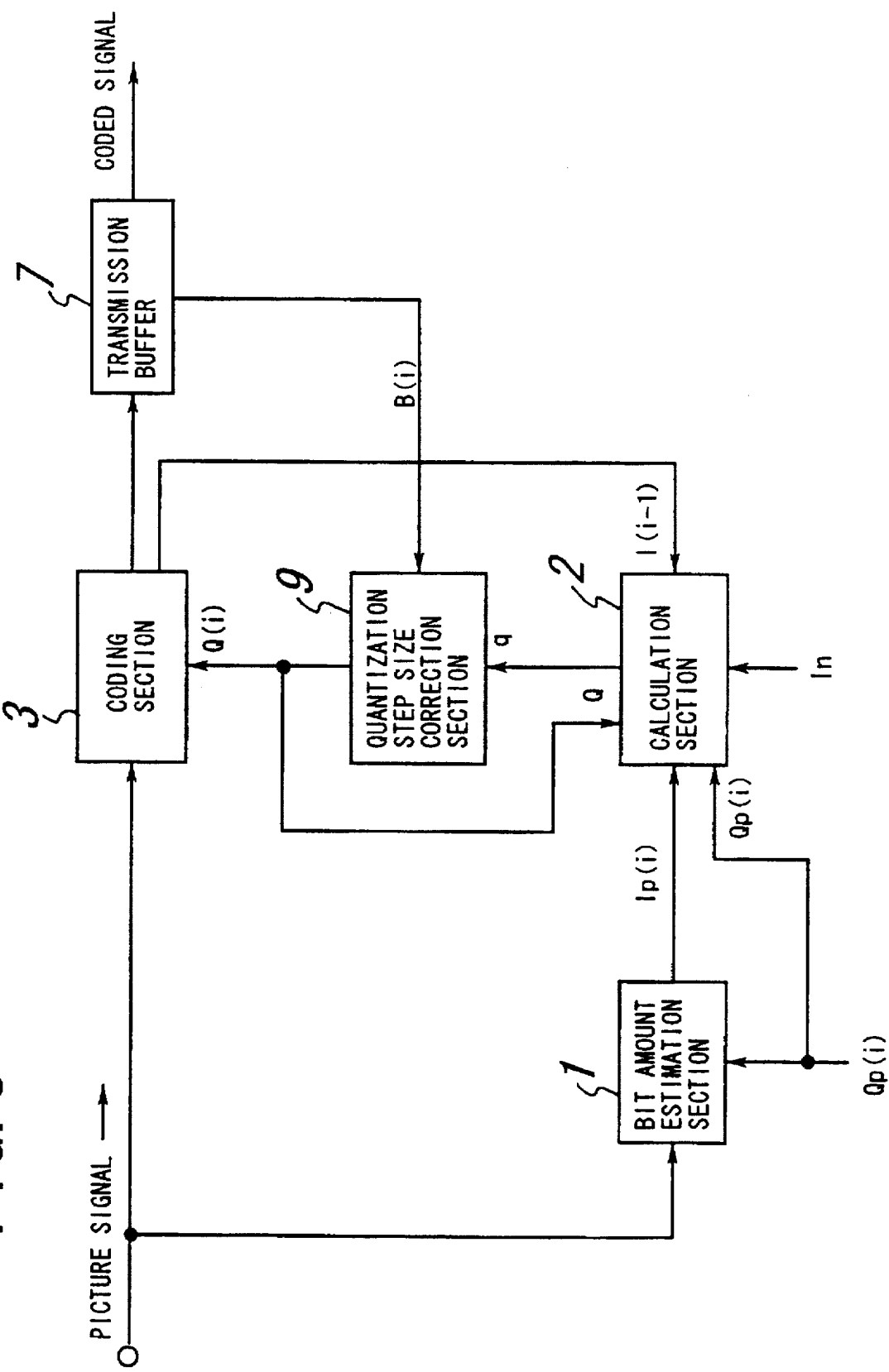
FIG. 5 is a block diagram of a yet further moving picture coding apparatus showing a fifth preferred embodiment of the present invention.

FIG. 5 shows in block diagram a moving picture coding apparatus according to a fifth preferred embodiment of the present invention. The moving picture coding apparatus shown is a modification to and is different from the moving picture coding apparatus described hereinabove with reference to FIG. 4 in that it includes a quantization step size correction section 9 in place of the target bit amount control section 8 of FIG. 4. The bit amount estimation section 1, the coding section 3 and the transmission buffer 7 operate similarly to the bit amount estimation section 1, the coding section 3 and the transmission buffer 7 of the moving picture coding apparatus of FIG. 4, respectively. The calculation section 2 determines a relationship between a quantization step size and a bit amount and calculates, using the thus determined relationship, a quantization step size with which a bit amount equal to a target bit amount $I_n$ given in advance is to be obtained, similarly to the calculation section 2 shown in FIG. 10. However, while the calculation section 2 shown in FIG. 10 outputs a value of Q(i) in the form of an integral number, the calculation section 2 in the present moving picture coding apparatus outputs a quantization step size q having an original accuracy of a decimal number. The quantization step size correction section 9 corrects the quantization step size q calculated by the calculation section 2 based on the occupation amount B(i) of the transmission buffer 7 and the quantization step size Q(i−1) used for coding for the last frame to obtain a quantization step size Q(i) to be used for actual coding.

Figure 15:
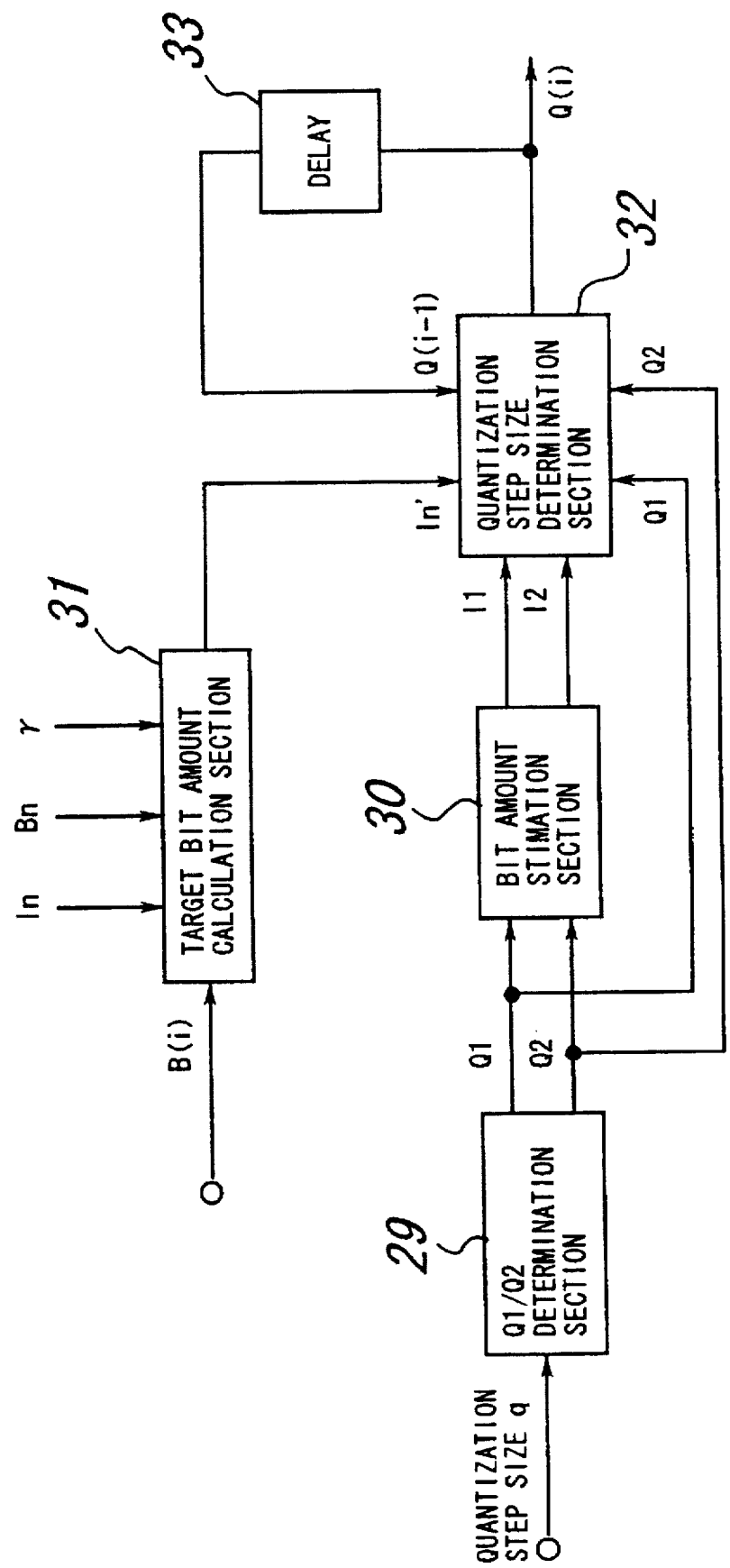
FIG. 15 is a block diagram showing a detailed construction of a quantization step size correction section of the moving picture coding apparatus shown in FIG. 5.
Figure 16:
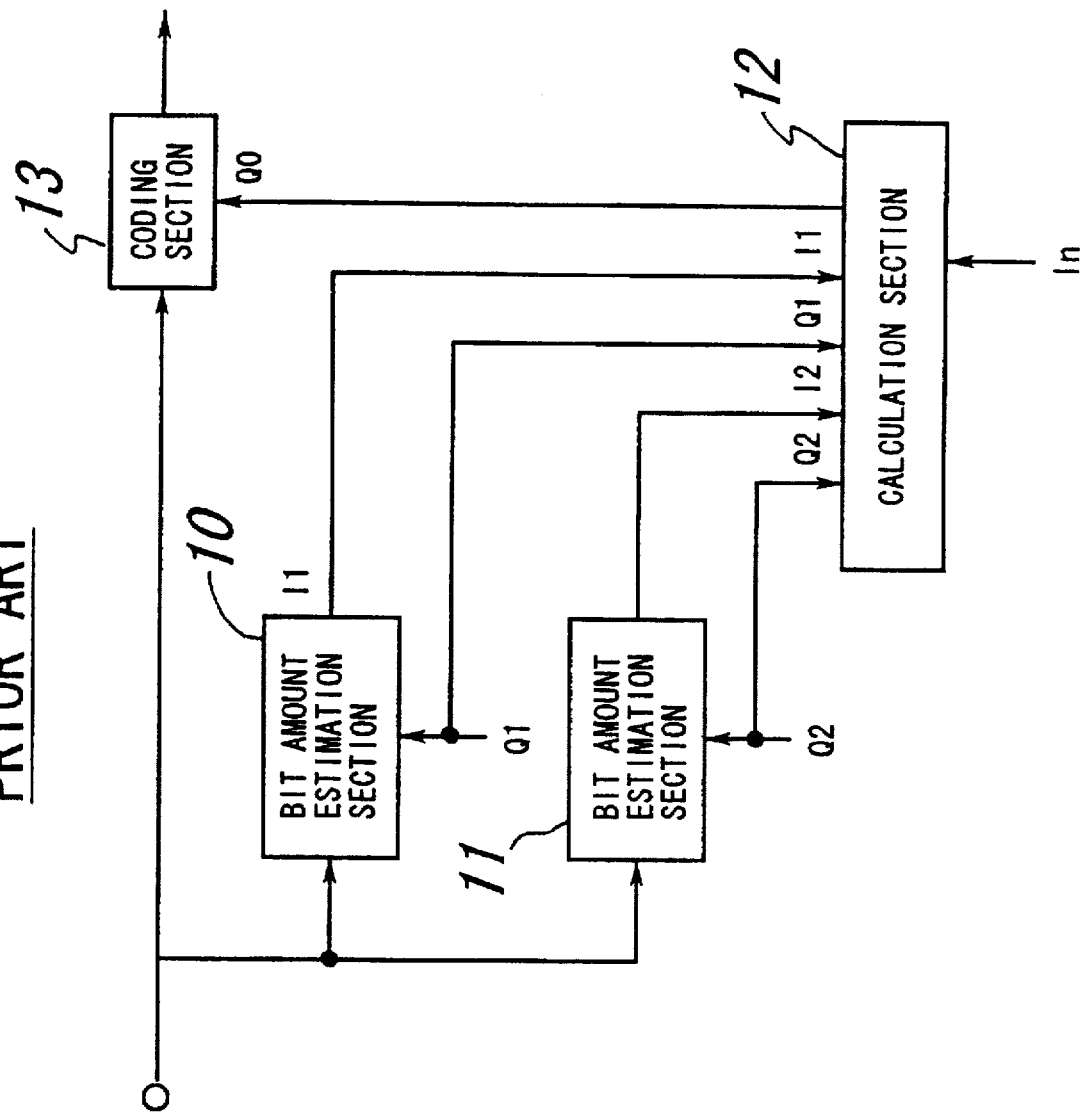
FIG. 16 is a block diagram showing an exemplary one of conventional moving picture coding apparatuses.
Figure 17:
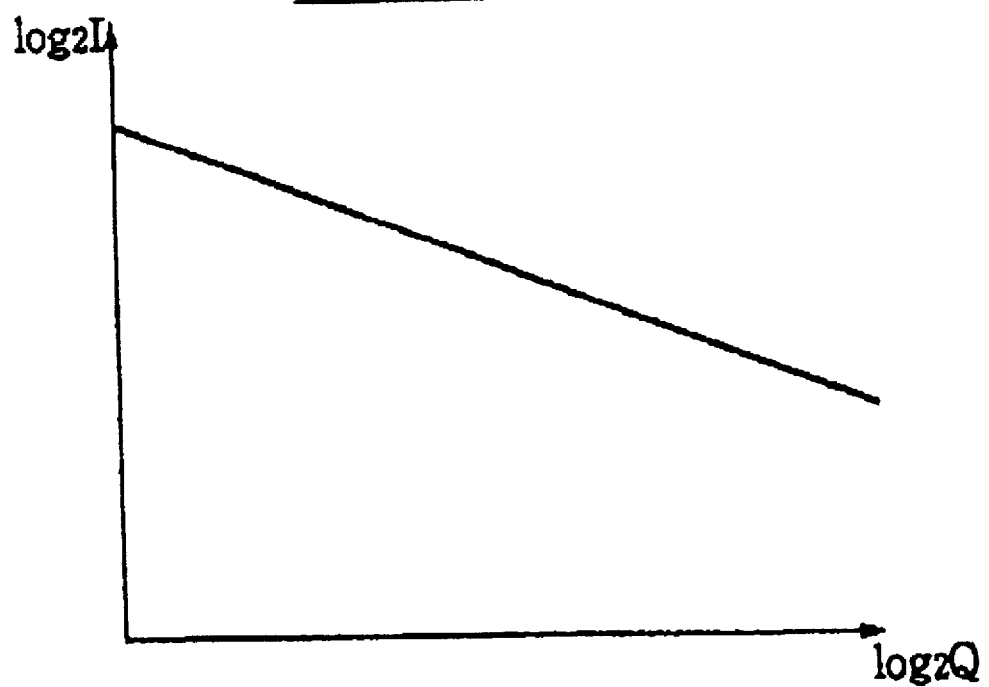
FIG. 17 is a diagram illustrating a relationship between a quantization step size and a bit amount in the conventional moving picture coding apparatus shown in FIG. 16.

FIG. 15 shows an example of a detailed construction of the quantization step size correction section 9. Referring to FIG. 15, the quantization step size correction section 9 shown includes a $Q_1/Q_2$ determination section 29, a bit amount estimation section 30, a target bit amount calculation section 31, a quantization step size determination section 32 and a delay section 33. The $Q_1/Q_2$ determination section 29 calculates values $Q_1$ and $Q_2$ by converting the quantization step size q calculated by the calculation section 2 into integral numbers by round-down and round-up, respectively. The bit amount estimation section 30 estimates amounts $I_1$ and $I_2$ of bits to be generated by coding using the thus calculated values $Q_1$ and $Q_2$ making use of the relationship between a quantization step size and a bit amount determined by the calculation section 2. The target bit amount calculation section 31 calculates, using the occupation amount B(i) of the transmission buffer 7, the reference value Bn for the buffer occupation amount and the reference value $I_n$ for the target bit amount, a target bit amount $\Gamma_n$ to be used for an object frame in accordance with the equation $\Gamma_n=I_n+(Bn-B(i))\times\gamma(\gamma>0)$. The value of $\gamma$ is selected from among optimum values determined statistically in advance in accordance with the target bit amount and the buffer capacity. The quantization step size determination section 32 calculates a quantization step size Q(i) using the values $Q_1$ and $Q_2$ determined by the $Q_1/Q_2$ determination section 29, the bit amounts $I_1$ and $I_2$ estimated by the bit amount estimation section 30, the target bit amount $\Gamma_n$ calculated by the target bit amount calculation section 31, the quantization step size Q(i−1) used for the last frame and a predetermined threshold level Th. A detailed method of determination of the quantization step size Q(i) by the quantization step size determination section 32 will be described below. First, determination when Q(i−1)≦q will be described. In this instance, if $\Gamma_n-I_1\leq\Gamma_n-I_2$, then the quantization step size Q(i) is set to Q(i)=$Q_1$. On the contrary if $\Gamma_n-I_1>\Gamma_n-I_2$, then when $\Gamma_n-I_1\leq$Th, the quantization step size Q(i) is set to Q(i)=$Q_1$, but when $\Gamma_n-I_1>$Th, the quantization step size Q(i) is set to Q(i)=$Q_2$. In contrast, when Q(i−1)>q, if $\Gamma_n-I_1\geq\Gamma_n-I_2$, then the quantization step size Q(i) is set to Q(i)=$Q_2$. However, if $\Gamma_n-I_1<\Gamma_n-I_2$, then when $\Gamma_n-I_2\leq$Th, the quantization step size Q(i) is set to Q(i)=$Q_2$, but when $\Gamma_n-I_2>$Th, the quantization step size Q(i) is set to Q(i)=$Q_1$.

Where a quantization step size calculated by the calculation section 2 is corrected by the quantization step size correction section 9 in this manner, further stabilized control can be achieved taking a buffer capacity and a variation in quantization step size into consideration.

Having now fully described the invention, it will be apparent to one of ordinary skill in the art that many changes and modifications can be made thereto without departing from the spirit and scope of the invention as set forth herein.

What is claimed is:

1. A moving picture coding apparatus wherein an amount of bits to be generated by quantization of an input moving picture signal input in units of a frame is controlled, comprising:

bit amount estimation means for producing an estimated bit amount using a predetermined estimated quantization step size;

coding means for quantizing a current frame of said input moving picture signal using a current frame quantization step size; and calculating means for calculating said current frame quantization step size such that a current frame bit amount approximating a target bit amount is obtained from a relational expression between a given quantization step size and a given bit amount, wherein said relational expression is derived from:

a current frame estimated quantization step size and a current frame estimated bit amount coded by said bit amount estimation means in response to said current frame estimated quantization step size, a previous frame estimated quantization step size and a previous frame estimated bit amount coded by said bit amount estimation means in response to said previous frame estimated quantization step size, a previous frame quantization step size previously used by said coding means, and a previous frame bit amount generated by said coding means in response to said preceding frame quantization step size.

2. A moving picture coding apparatus as claimed in claim 1, further comprising an estimated quantization step size control means for controlling said current frame estimated quantization step size, which is to be used by said bit amount estimation means, in accordance with a predetermined algorithm using said previous frame bit amount.

3. A moving picture coding apparatus as claimed in claim 1, further comprising a motion amount discrimination means for discriminating an amount of motion of the input moving picture signal with reference to a predetermined reference, and a target bit amount control means for setting the target bit amount in accordance with an output from said discrimination means.

4. A moving picture coding apparatus as claimed in claim 1, further comprising a buffer for leveling coded data output from said coding means with respect to time, and a target bit amount control means for setting said target bit amount in accordance with a buffer occupancy of coded data in said buffer.

5. A moving picture coding apparatus as claimed in claim 1, further comprising a buffer for leveling coded data output from said coding means with respect to time, and wherein said calculating means further comprises:

a quantization step size correction means for correcting the current frame quantization step size calculated by said calculation means in accordance with a buffer occupancy of coded data in said buffer.

6. A moving picture coding apparatus as claimed in claim 2, wherein said estimated quantization step size control means further comprises:

a first sensitivity coefficient multiplication means for multiplying said previous frame bit amount by a first sensitivity coefficient;

a second sensitivity coefficient multiplication means for multiplying a first-order differential of said previous frame bit amount by a second sensitivity coefficient;

an adding section for adding respective resulting outputs from said first and second sensitivity coefficient multiplication means to calculate a quantization step size variation;

a quantization step size determination means for adding said quantization step size variation to said previous frame quantization step size to generate said current frame estimated quantization step size.

7. A moving picture coding apparatus as claimed in claim 2, wherein said estimated quantization step size control means further comprises:

a quantization step size determination means for generating a quantization step size variation in accordance with a magnitude of movement of said moving picture signal, said quantization step size variation being added to said previous frame quantization step size to generate said current frame estimated quantization step size.

8. A moving picture coding apparatus as claimed in claim 3, wherein said motion amount discrimination means further comprises:

a moving block discrimination means for classifying each block of a plurality of moving picture signal blocks into a moving frame or a still frame by comparing a difference between a current frame of the moving picture signal and a previous frame of the moving picture signal with a preset moving block threshold value;

a moving block calculating means for counting the number of blocks discriminated to be moving blocks for the current frame to obtain a moving block number for the current frame;

a moving frame discrimination means for comparing a ratio of said moving block number to a total block number for the current frame with a predetermined moving threshold level, and determining the current frame to be a moving frame if said ratio is higher than the moving threshold level;

a still frame discrimination means for comparing said ratio of said moving block number to said total block number for the current frame with a predetermined still threshold level, and determining the current frame to be a still frame if said ratio is lower than the moving threshold level.

9. A moving picture coding apparatus as claimed in claim 3, wherein said target bit amount control means further comprises:

a target bit amount calculation section for setting said target bit amount based on a reference target bit amount and a discriminated amount of motion output from said motion amount discrimination means, wherein the target bit amount is reduced if said current frame is determined to be a moving frame, wherein the target bit amount is increased if said current is determined to be a still frame.

10. A moving picture coding apparatus as claimed in claim 4, wherein said target bit amount control means sets said target bit amount based upon said buffer occupancy in addition to a reference buffer occupancy amount and a reference target bit amount.

11. A moving picture coding apparatus as claimed in claim 5, wherein said current frame quantization step size is calculated to have decimal accuracy, and wherein said quantization step size correction means further comprises:

a first/second quantization step size determination section for calculating a first and a second quantization step sizes by converting said current frame quantization step size into an integral number by respective round-down and round-up operations;

a bit amount estimation section for estimating a first and a second bit amounts by using said relational expression and said first and second quantization step sizes;

a target bit amount calculation section for generating an object target bit amount using said buffer occupancy in accordance with a reference buffer occupancy value and a reference target value;

a quantization step size determination section for generating a new current frame quantization step size in accordance with said first and second quantization step sizes, said first and second bit amounts, said object target bit amount, and said previous frame quantization step size.

* * * * *

UNITED STATES PATENT AND TRADEMARK OFFICE
CERTIFICATE OF CORRECTION

PATENT NO. : 5,721,589
DATED : February 24, 1998
INVENTOR(S) : Murata

It is certified that error appears in the above-identified patent and that said Letters Patent is hereby corrected as shown below:

Column 5, line 62, after "section" insert --17--;

Column 5, line 63, delete "In" and insert --$I_n$--.

Signed and Sealed this

First Day of September, 1998

Attest:

BRUCE LEHMAN

Attesting Officer    Commissioner of Patents and Trademarks